Dec. 20, 1966 W. B. WHITNEY 3,293,317
PRODUCTION OF 3-METHYL-1-BUTENE
Filed April 5, 1962 2 Sheets-Sheet 1

INVENTOR.
W. B. WHITNEY
BY *Young & Quigg*
ATTORNEYS

Dec. 20, 1966  W. B. WHITNEY  3,293,317
PRODUCTION OF 3-METHYL-1-BUTENE
Filed April 5, 1962  2 Sheets-Sheet 2

INVENTOR.
W. B. WHITNEY
BY *Young & Quigg*
ATTORNEYS

United States Patent Office 3,293,317
Patented Dec. 20, 1966

3,293,317
PRODUCTION OF 3-METHYL-1-BUTENE
William B. Whitney, Bartlesville, Okla., assignor to Phillips Petroleum Company, a corporation of Delaware
Filed Apr. 5, 1962, Ser. No. 185,358
8 Claims. (Cl. 260—683.2)

This invention relates to the production of 3-methyl-1-butene. In a specific aspect, this invention relates to the production of 3-methyl-1-butene by the isomerization of 2-methyl-1-butene and/or 2-methyl-2-butene.

3-methyl-1-butene is present in equilibrium mixtures of the isopentenes in relatively small concentrations, the concentration increasing with temperature up to 1500° F. or higher. As this isomer has substantial commercial value, it is desirable that a process be obtained to increase the production of 3-methyl-1-butene.

It has been discovered that in attempts to isomerize the other isomers to 3-methyl-1-butene by catalytic isomerization, that as contact time and temperature have been increased to secure a more complete approach to equilibrium, dehydrogenation to isoprene increases. The boiling point of isoprene is between that of 2-methyl-1-butene and 2-methyl-2-butene. Therefore, isoprene cannot be effectively separated from this mixture by fractional distillation. Solvent extraction is an appropriate separation means, but this requires a heavy financial investment in equipment and is, therefore, an expensive process. It is undersiable that the process of isomerizing iso-pentenes to 3-methyl-1-butene should be limited and restricted to an elaborate solvent extraction process necessary to recover isoprene as a by-product, or to the recycling of the isoprene thereby increasing the coke on the isomerization catalyst, and increasing the production of cracked products within the isomerization zone.

I have discovered a process for the production of 3-methyl-1-butene comprising the following steps: (1) isomerizing the iso-pentenes other than 3-methyl-1-butene at elevated temperatures and in the presence of a catalyst, (2) fractionally separating the isomerization zone effluent, (3) combining hydrogen and the residual C₅ olefins and diolefins, (4) hydrogenating the isoprene in the combined mixture to 2-methyl-1-butene and 2-methyl-2-butene substantially without hydrogenating the monoolefins to saturated hydrocarbon, (5) recycling the mixed 2-methyl-1-butene and 2-methyl-2-butene stream to the isomerization zone, and (6) recovering 3-methyl-1-butene from step (2) as a product.

In another embodiment of the inventive process, following step (4), the mixture of 2-methyl-1-butene and 2-methyl-2-butene is passed to a second isomerization zone wherein said 2-methyl-1-butene is isomerized to 2-methyl-2-butene; and the separated 2-methyl-2-butene fraction recycled to the first isomerization zone.

Accordingly, an object of my invention is to provide a process for the production of 3-methyl-1-butene.

Another object of my invention is to provide a process for the isomerization of 2-methyl-1-butene and/or 2-methyl-2-butene to 3-methyl-1-butene.

Other objects, advantages and features of my invention will be readily apparent to those skilled in the art from the following description and the appended claims.

Figure 1:
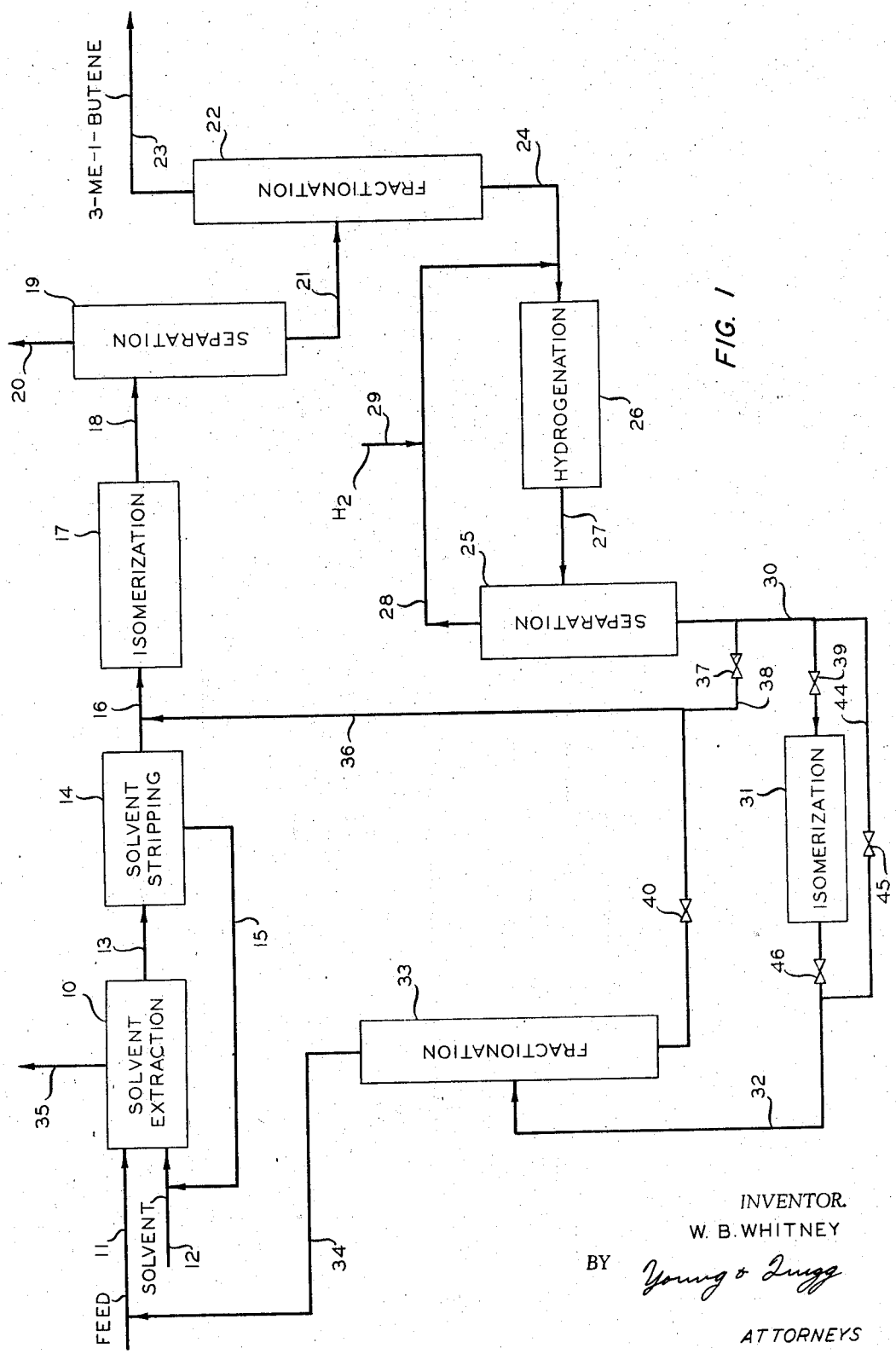
FIGURE 1 is a schematic representation of one embodiment of the inventive process.

Referring to FIGURE 1, the hydrocarbon mixture comprising 2-methyl-1-butene, 2-methyl-2-butene and other $C_5$ hydrocarbons is passed via conduit means 11 to solvent extraction zone 10. Within solvent extraction zone 10, the hydrocarbon feed is contacted with a solvent, such as aqueous sulfuric acid having a concentration of 50–70 weight percent acid, passed to solvent extraction zone 10 via conduit means 12. Preferably, the solvent and hydrocarbon feed streams are passed to solvent extraction zone 10 at a rate so as to maintain an acid phase in the range of 40–70 volume percent. The temperature of the solvent extraction zone is generally maintained below 100° F., preferably in the range of 20–60° F.

A hydrocarbon stream is withdrawn from solvent extraction zone 10 via conduit means 35. A rich solvent stream containing equilibrium concentractions of absorbed 2-methyl-1-butene and 2-methyl-2-butene is passed from solvent extraction zone 10 via conduit means 13 to a solvent stripping zone 14. Within solvent stripping zone 14, the absorbed amylenes are stripped from the solvent and passed via conduit means 16 to isomerization zone 17. The stripped solvent is recycled via conduit means 15 to the solvent extraction zone 10. A conventional process for stripping the amylenes from the rich solvent can be employed such as the hydrocarbon extraction of the amylenes disclosed in U.S. Patent 2,958,715. The stripping process therein disclosed comprises the hydrocarbon stripping of the rich sulfuric acid phase containing absorbed amylenes (2-methyl-1-butene and 2-methyl-2-butene) and the fractional separation of the hydrocarbons and amylenes from the mixture comprising hydrocarbons and absorbed amylenes.

Within isomerization zone 17, the feedstream is contracted with a conventional isomerization catalyst such as natural or synthetic magnesium oxide, or the chromia-alumina catalyst of U.S. Patent 2,921,103. The temperature of the isomerization zone can be maintained in the range of about 1050–1200° F. and the pressure of the isomerization zone maintained from about atmospheric to 100 p.s.i.g. Within isomerization zone 17, 2-methyl-1-butene and 2-methyl-2-butene are isomerized to produce an effluent wherein the 3-methyl-1-butene concentration with reference to the amylene fraction is preferably at least 50 percent of the equilibrium concentration at the isomerization temperature. The equilibrium concentration of 3-methyl-1-butene in equilibrium mixtures of the amylenes is a function of the isomerization temperature. For example, the equilibrium concentrations of 3-methyl-1-butene at various isomerization temperatures are as follows:

| Concentration: | Temperature, °F. |
|---|---|
| 8.91 | 1050 |
| 9.41 | 1100 |
| 9.75 | 1150 |
| 9.93 | 1200 |

The effluent emitted from the isomerization zone 17 via conduit means 18 will have an isoprene concentration ranging from about 10 to 200 volume percent of the 3-methyl-1-butene concentration.

It is within the scope of this invention to contact the isomerization zone feed with catalyst in the presence of steam. The quantity of steam employed will vary with the specific catalyst utilized, but will normally range from 1 to 20 moles of steam per mole of monoolefin.

The isomerization zone effluent is passed from isomerization zone 17 to a separation zone 19 via conduit means 18. Within separation zone 19, the effluent is partially condensed with the vaporous $C_4$ hydrocarbons and lighter components withdrawn from separation zone 19 via conduit means 20. The $C_5$ and heavier hydrocarbon liquid fraction is withdrawn from separation zone 19 via conduit means 21 and passed to a conventional fractionation zone 22.

When steam is passed to isomerization zone 17, the steam in the effluent passed to separation zone 19 via conduit means 18 is condensed. The condensed water can be separated from the mixture comprising $C_5$ hydrocarbons and water by passing the mixture to a phase separation zone, not herein illustrated, and permitting the mixture to settle in said phase separation zone, withdrawing the separated water phase, and passing the separated hydrocarbon phase via conduit means 21 to fractionation zone 22.

Fractionation zone 22 can be operated at a top temperature of about 130° F. and at the pressure required to fractionate the feed stream so as to produce a 3-methyl-1-butene product stream passing from fractionation zone 22 via conduit means 23. The remainder of the feed stream passed to fractionation zone 22 via conduit means 21 is withdrawn from fractionation zone 22 via conduit means 24, mixed with hydrogen passed to conduit means 24 via conduit means 28, and passed to a conventional hydrogenation zone 26. The volume of hydrogen passed to the hydrogenation zone is the quantity required to hydrogenate the isoprene to the monoolefin.

Within hydrogenation zone 26, isoprene is hydrogenated to 2-methyl-1-butene and 2-methyl-2-butene. The hydrogen and hydrocarbon mixed feed is contacted with a suitable hydrogenation catalyst such as skeletal nickel with absorbed quinoline or pyridine discussed in Bulletin No. 9 of U.S.S.R. Academy of Sciences, Division of Chemical Science, page 1640 (1959). The temperature of the hydrogenation zone can range from about 40 to about 125° F. The pressure of the hydrogenation zone 26 can be maintained in the range from about atmospheric to 100 p.s.i.g.

An effluent stream is withdrawn from hydrogenation zone 26 via conduit means 27 and passed to separation zone 25. Within separation zone 25, hydrogen is separated from the remainder of the effluent mixture, withdrawn from separation zone 25 via conduit means 28 and recycled to hydrogenation zone 26. Additional hydrogen as required is passed to conduit means 28 via conduit means 29.

According to one embodiment of the inventive process, a liquid stream comprising 2-methyl-1-butene and 2-methyl-2-butene is withdrawn from separation zone 25 via conduit means 30 and recycled via conduit means 38, valve means 37, conduit means 36, and conduit means 16 to isomerization zone 17. In operation, small concentrations of isopentane and n-pentane will be formed in isomerization zone 17. The concentrations of isopentane and n-pentane will increase if not removed from the recycle isomerization process. In addition thereto, 1-pentene and trans-2-pentene will be formed in hydrogenation zone 26. These normal paraffins and olefins would increase in concentration until said normal paraffins and olefins are removed by destruction in isomerization zone 17.

Accordingly, a second embodiment, as hereinafter described, is the preferred embodiment. A separated liquid stream is withdrawn from separation zone 25 and passed via conduit means 30 and valve means 39 to isomerization zone 31. Isomerization zone 31 is a low temperature isomerization zone permitting the isomerization of 2-methyl-1-butene to 2-methyl-2-butene. The temperature of isomerization zone 31 is maintained in the range of about 100–150° F. The pressure of isomerization zone 31 is maintained in the range from about atmospheric to 100 p.s.i.g. Within isomerization zone 31, the feed stream is contacted with an isomerization catalyst such as brucite. An effluent stream comprising isopentane, 1-pentene, cis-2-pentene, trans-2-pentene, n-pentane, 2-methyl-1-butene and 2-methyl-2-butene is withdrawn from isomerization zone 31 and passed via conduit means 32 to a conventional fractionation zone 33.

Fractionation zone 33 can be operated at a top temperature of about 130° F. and at a required pressure so as to pass from fractionation zone 33 an overhead stream via conduit means 34 comprising 1-pentene, 2-pentene, 2-methyl-1-butene, n-pentane and isopentane. The overhead product stream is recycled via conduit means 34 and conduit means 11 to solvent extraction zone 10, thereby providing for the recovery of the 2-methyl-1-butene in the overhead product stream. A bottoms product stream comprising 2-methyl-2-butene is withdrawn from fractionation zone 33 via conduit means 36 and recycled via valve means 40 and conduit means 16 to isomerization zone 17.

Referring again to FIGURE 1, another embodiment of the inventive process will be described. As in the case of the first two embodiments described, a liquid phase is withdrawn from separation zone 25 via conduit means 30. The liquid phase is passed via conduit means 44, valve means 45 and conduit means 32 as a feed stream to fractionation zone 33. Fractionation zone 33 can be operated at a top temperature of 130° F. and a required pressure so as to pass from said fractionation zone 33 an overhead stream comprising isopentane, 1-pentene, 2-methyl-1-butene, 2-pentene, and n-pentane. This overhead stream is recycled via conduit means 34 and 11 to solvent extraction zone 10. A bottom product stream comprising 2-methyl-2-butene is withdrawn from fractionation zone 33 via conduit means 36 and recycled via valve means 40 and conduit means 16 to isomerization zone 17.

In operating the inventive process by the method described in connection with the second and third embodiments, the build-up of 2-pentenes and n-pentane is prevented as said 2-pentenes and n-pentane are removed from the isomerization process in the solvent extraction step via conduit means 35.

Figure 2:
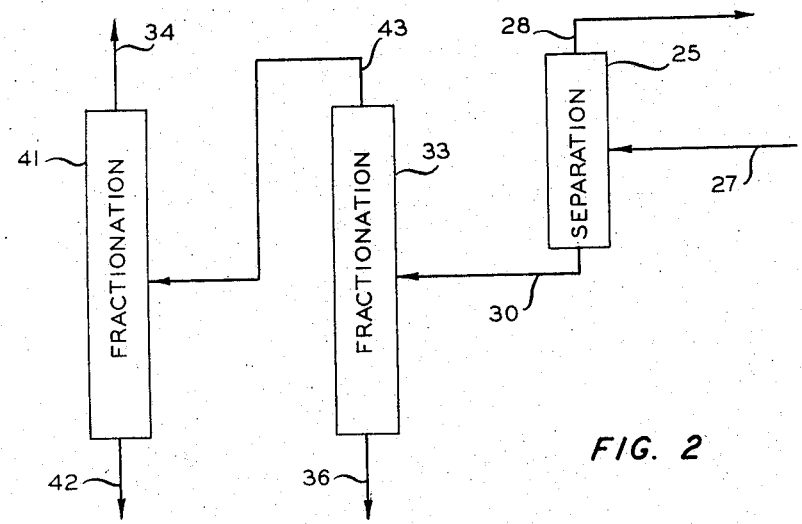
FIGURE 2 is a schematic representation of another embodiment of the inventive process.

Referring to FIGURE 2, a fourth embodiment of the inventive process will be described. As in the case of the first three embodiments, a liquid phase is withdrawn from separation zone 25 via conduit means 30. This liquid phase is passed to fractionation zone 33. An overhead product stream comprising isopentane, 1-pentene, 2-methyl-1-butene, 2-pentene, and n-pentene, and n-pentane is withdrawn from fractionation zone 33 via conduit means 43 and passed to fractionation zone 41. A bottom product stream comprising 2-methyl-2-butene is withdrawn from fractionation zone 33 and recycled, in the heretofore described manner, via conduit means 36, valve means 40 and conduit means 16 to isomerization zone 17. Fractionation zone 33 can be operated at a top temperature of 130° F. and at the required pressure to effectuate the described separation.

An overhead product stream comprising isopentane, 1-pentene and 2-methyl-1-butene is withdrawn from fractionation zone 41 via conduit means 34 and recycled to the solvent extraction zone 10. A bottom product stream comprising 2-pentenes and normal pentane is withdrawn from fractionation zone 41 via conduit means 42 and removed from the isomerization process. Fractionation zone 41 can be operated at a top temperature of 130° F. and at a required pressure to effectuate the desired separation. In operating the isomerization process by the described fourth embodiment, the build-up of 2-pentenes and n-pentane within the isomerization process is prevented by the removal of said 2-pentenes and n-pentane from the process via conduit means 42.

In operation of the inventive recycle isomerization process wherein a stream is recycled to the solvent extraction zone, a portion of the 2-methyl-1-butene passed to solvent extraction zone may be isomerized to 2-methyl-2-butene.

Figure 3:
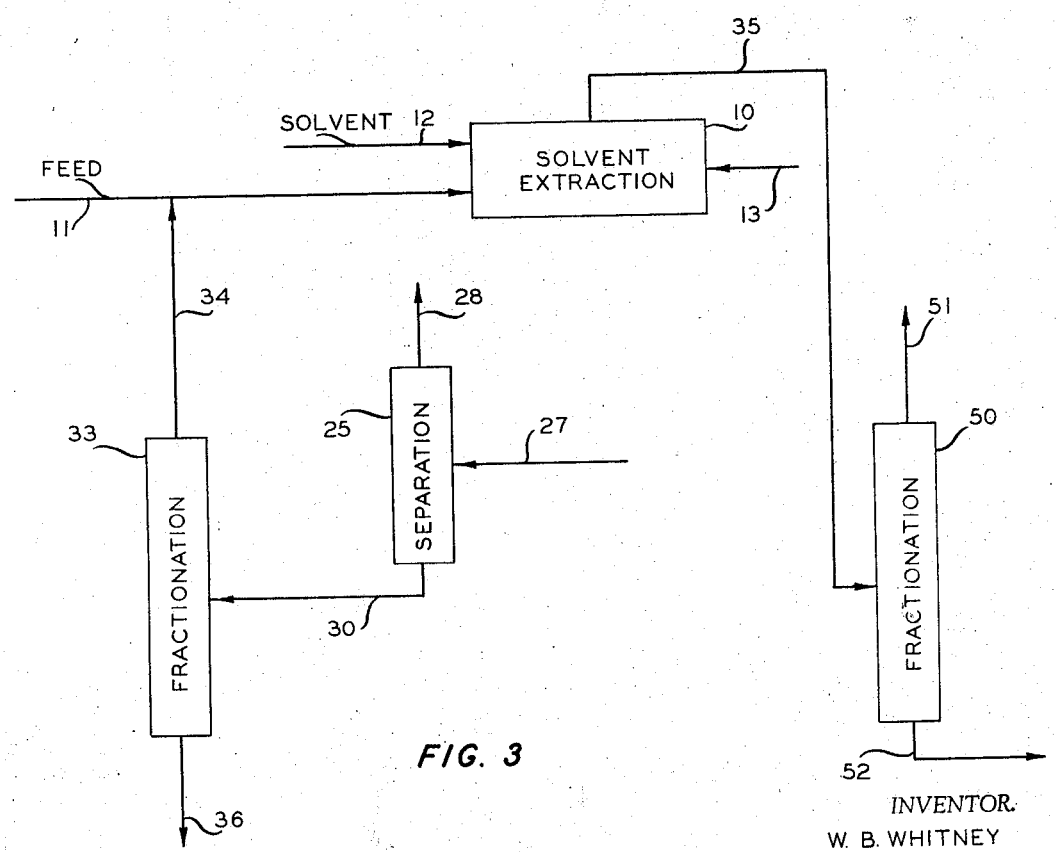
FIGURE 3 is a schematic representation of yet another embodiment of the inventive process.

Equilibrium concentrations of 2-methyl-1-butene and 2-methyl-2-butene are present in the hydrocarbon and acid phases within solvent extraction zone 10. Referring to FIGURE 3, there is shown a fifth embodiment of the inventive process wherein 2-methyl-2-butene passed from solvent extraction zone 10 with the hydrocarbon phase via conduit means 35 can be recovered. The hydrocarbon phase withdrawn from solvent extraction zone 10 via conduit means 35 is passed to a fractionation zone 50. An overhead product stream is withdrawn from fractionation zone 50 via conduit means 51, said overhead product stream comprising isopentane, 1-pentene, 2-methyl-1-butene, 2-pentene and n-pentane. A bottom product stream is withdrawn from fractionation zone 50 via conduit means 52, said bottom product stream comprising 2-methyl-2-butene. The bottom product stream is passed to isomerization zone 17. Fractionation zone 50 can be operated at a top temperature of 130° F. and at the required pressure necessary to effectuate desired separation.

An advantage of the inventive process is that the isomerization step conducted in isomerization zone 17 can be operated to permit close approach to equilibrium without the need to avoid completely the dehydrogenation of the isopentanes. A second advantage of the inventive process is that only conventional fractional distillations are required to separate the products. A third advantage of the inventive isomerization process is that the hydrogenation of isoprene to convert the isoprene to the original feed eliminates the necessity of providing an expensive separation process for the solvent extraction of isoprene and also eliminates the detrimental effect produced by contacting the isomerization catalyst with the byproduct isoprene.

As will be evident to those skilled in the art, various modifications of this invention can be made, or followed, in the light of the foregoing disclosure and discussion without departing from the spirit or scope thereof.

I claim:

1. A process for the production of 3-methyl-1-butene which comprises contacting a $C_5$ hydrocarbon stream containing at least one component selected from the group consisting of 2-methyl-1-butene and 2-methyl-2-butene in a solvent extraction zone in which said one component is dissolved in a selective solvent, withdrawing from said solvent extraction zone a hydrocarbon stream consisting of undissolved hydrocarbons, passing a rich solvent stream containing said one component from said solvent extraction zone to a solvent stripping zone, withdrawing from said solvent stripping zone said selective solvent stripped of said one component, passing from said solvent stripping zone to a first isomerization zone a hydrocarbon stream containing said one component, contacting the hydrocarbon feed passed to said first isomerization zone with an isomerization catalyst which will initiate the conversion of 2-methyl-1-butene and 2-methyl-2-butene to 3-methyl-1-butene at a temperature in the range of 1050–1200° F. and for a time sufficient to approach at least 50 percent equilibrium conditions for the isomerization of said 2-methyl-2-butene and 2-methyl-1-butene to 3-methyl-1-butene, thereby also producing unavoidably substantial amounts of isoprene, passing an effluent stream containing 3-methyl-1-butene and isoprene produced in said first isomerization zone and said unconverted one component from said first isomerization zone to a separation zone in which a $C_4$ and lighter hydrocarbon stream is separated from a 3-methyl-1-butene product stream and from a $C_5$ hydrocarbon stream containing isoprene and said unconverted said one component, withdrawing from said separation zone a $C_4$ hydrocarbon and lighter vaporous stream, withdrawing from said separation zone a 3-methyl-1-butene product stream, passing a $C_5$ hydrocarbon stream containing isoprene and said unconverted said one component from said separation zone to a hydrogenation zone in which isoprene is contacted with a selective hydrogenation catalyst which is adapted to initiate the reaction of selective hydrogenation of isoprene to one of 2-methyl-1-butene and 2-methyl-2-butene, passing hydrogen to said hydrogenation zone, contacting the hydrocarbon feed hydrogenation zone in said hydrogenation zone with a hydrogenation catalyst, withdrawing an effluent stream containing 2-methyl-1-butene and 2-methyl-2-butene from said hydrogenation zone, separating hydrogen from said hydrogenation zone effluent stream, passing said hydrogen-free hydrogenation zone effluent stream containing 2-methyl-1-butene and 2-methyl-2-butene to a second isomerization zone wherein said effluent stream is contacted with an isomerization catalyst which will initiate the conversion of the 2-methyl-1-butene to 2-methyl-2-butene, passing an effluent stream containing 2-methyl-2-butene from said second isomerization zone to a fractionation zone, passing an overhead product containing 2-methyl-1-butene and lighter products from said fractionation zone to said solvent extraction zone as recycle to thereby eliminate build-up of lighter products in said system, withdrawing from said fractionation zone a bottom product stream containing 2-methyl-2-butene, and recycling said bottom product stream from said fractionation zone to said first isomerization zone.

2. The process of claim 1 wherein the temperature and pressure of said hydrogenation zone is maintained in the range of 40–125° F. and from atmospheric to 100 p.s.i.g., respectively.

3. The process of claim 1 wherein the temperature and pressure of said first isomerization zone is maintained in the range of 1050–1200° F. and from atmospheric to 100 p.s.i.g., respectively.

4. The process of claim 3 wherein the temperature and pressure of said hydrogenation zone is maintained in the range of 40–125° F. and from atmospheric to 100 p.s.i.g., respectively.

5. The process of claim 4 wherein the temperature and pressure of said second isomerization zone is maintained in the range of 100–150° F. and from atmospheric to 100 p.s.i.g., respectively.

6. A process for the production of 3-methyl-1-butene which comprises contacting a $C_5$ hydrocarbon stream containing at least one component selected from the group consisting of 2-methyl-1-butene and 2-methyl-2-butene in a solvent extraction zone in which said one component is dissolved in a selective solvent, withdrawing from said solvent extraction zone a hydrocarbon stream consisting of undissolved hydrocarbons, passing a rich solvent stream containing said one component from said solvent extraction zone to a solvent stripping zone, withdrawing from said solvent stripping zone said selective solvent stripped of said one component, passing from said solvent stripping zone to a first isomerization zone a hydrocarbon stream containing said one component, contacting the hydrocarbon feed passed to said first isomerization zone with an isomerization catalyst which will initiate the conversion of 2-methyl-1-butene and 2-methyl-2-butene to 3-methyl-1-butene at a temperature in the range of 1050–1200° F. and for a time sufficient to approach at least 50 percent equilibrium conditions for the isomerization of said 2-methyl-2-butene and 2-methyl-1-butene to 3-methyl-1-butene, thereby also producing unavoidably substantial amounts of isoprene, passing an effluent stream containing 3-methyl-1-butene and isoprene produced in said first isomerization zone and said unconverted one component from said first isomerization zone to a separation zone in which a $C_4$ and lighter hydrocarbon stream is separated from a 3-methyl-1-butene product stream and from a $C_5$ hydrocarbon stream containing isoprene and said unconverted said one component, withdrawing from said separation zone a $C_4$ hydrocarbon and lighter vaporous stream, withdrawing from said separation zone a 3-methyl-1-butene product stream, passing a $C_5$ hydrocarbon stream containing isoprene and said unconverted said one component from said separation zone to a hydrogenation zone in which isoprene is contacted with a selective hydrogenation catalyst which is adapted to initiate the reaction of selective hydrogenation of isoprene to one of 2-methyl-1-butene and 2-methyl-2-butene, passing hydrogen to said hydrogenation zone, contacting the hydrocarbon feed stream in said hydrogenation zone with a hydrogenation catalyst, withdrawing an effluent stream containing 2-methyl-1-butene and 2-methyl-2-butene from said hydrogenation zone, separating hydrogen from said hydrogenation zone effluent stream, passing a hydrogen-free hydrogenation zone effluent stream containing said one component to a fractionation zone in which 2-methyl-1-butene and lighter products comprising normal paraffins are separated from 2-methyl-2-butene and heavier products, removing said 2-methyl-1-butene and said lighter products as an overhead stream from said fractionation zone and passing the same as recycle to said solvent extraction zone to thereby remove said lighter products from the system, passing a bottom product stream containing said 2-methyl-2-butene and heavier products from said fractionation zone as recycle to said first isomerization zone.

7. A process for the production of 3-methyl-1-butene which comprises contacting a $C_5$ hydrocarbon stream containing at least one component selected from the group consisting of 2-methyl-1-butene and 2-methyl-2-butene in a solvent extraction zone in which said one component is dissolved in a selective solvent, withdrawing from said solvent extraction zone a hydrocarbon stream consisting of undissolved hydrocarbons, passing a rich solvent stream containing said one component from said solvent extraction zone to a solvent stripping zone, withdrawing from said solvent stripping zone said selective solvent stripped of said one component, passing from said solvent stripping zone to an isomerization zone a hydrocarbon stream containing said one component, contacting the hydrocarbon feed passed to said isomerization zone with an isomerization catalyst which will initiate the conversion of 2-methyl-1-butene and 2-methyl-2-butene to 3-methyl-1-butene at a temperature in the range of 1050–1200° F. and for a time sufficient to approach at least 50 percent equilibrium conditions for the isomerization of said 2-methyl-2-butene and 2-methyl-1-butene to 3-methyl-1-butene, thereby also producing unavoidably substantial amounts of isoprene, passing an effluent stream containing 3-methyl-1-butene and isoprene produced in said isomerization zone and said unconverted one component from said isomerization zone to a separation zone in which a $C_4$ and lighter hydrocarbon stream is separated from a 3-methyl-1-butene product stream and from a $C_5$ hydrocarbon stream containing isoprene and said unconverted said one component, withdrawing from said separation zone a $C_4$ hydrocarbon and lighter vaporous stream, withdrawing from said separation zone a 3-methyl-1-butene product stream, passing a $C_5$ hydrocarbon stream containing isoprene and said unconverted said one component from said separation zone to a hydrogenation zone in which isoprene is contacted with a selective hydrogenation catalyst which is adapted to initiate the reaction of selective hydrogenation of isoprene to one of 2-methyl-1-butene and 2-methyl-2-butene, passing hydrogen to said hydrogenation zone, contacting the hydrocarbon feed stream in said hydrogenation zone with a hydrogenation catalyst, withdrawing an effluent stream containing 2-methyl-1-butene and 2-methyl-2-butene from said hydrogenation zone, separating hydrogen from said hydrogenation zone effluent stream, passing a hydrogen-free hydrogenation zone effluent stream to a first fractionation zone wherein a 2-methyl-1-butene and lighter product stream is separated from 2-methyl-2-butene, passing an overhead product stream containing 2-methyl-1-butene and lighter products comprising normal pentanes and normal pentenes from said first fractionation zone to a second fractionation zone in which 2-methyl-1-butene is separated from normal pentenes and normal pentanes, passing a bottom product stream containing 2-methyl-2-butene from said first fractionation zone as recycle to said isomerization zone, passing an overhead product stream containing 2-methyl-1-butene from said second fractionation zone as recycle to said solvent extraction zone, and withdrawing a bottom product stream containing said normal pentenes and normal pentanes from said second fractionation zone, to thereby remove the same from the system.

8. A process for the production of 3-methyl-1-butene which comprises contacting a $C_5$ hydrocarbon stream containing at least one component selected from the group consisting of 2-methyl-1-butene and 2-methyl-2-butene in a solvent extraction zone in which said one component is dissolved in a selective solvent, withdrawing from said solvent extraction zone a hydrocarbon stream consisting of undissolved hydrocarbons, passing a rich solvent stream containing said one component from said solvent extraction zone to a solvent stripping zone, withdrawing from said solvent stripping zone said selective solvent stripped of said one component, passing from said solvent stripping zone to an isomerization zone a hydrocarbon stream containing said one component, contacing the hydrocarbon feed passed to said isomerization zone with an isomerization catalyst which will initiate the conversion of 2-methyl-1-butene and 2-methyl-2-butene to 3-methyl-1-butene at a temperature in the range of 1050–1200° F. and for a time sufficient to approach at least 50 percent equilibrium conditions for the isomerization of said 2-methyl-2-butene and 2-methyl-1-butene to 3-methyl-1-butene, thereby also producing unavoidably substantial amounts of isoprene, passing an effluent stream containing 3-methyl-1-butene and isoprene produced in said isomerization zone and said unconverted one component from said isomerization zone to a separation zone in which a $C_4$ and lighter hydrocarbon stream is separated from a 3-methyl-1-butene product stream and from a $C_5$ hydrocarbon stream containing isoprene and said unconverted said one component, withdrawing from said separation zone a $C_4$ hydrocarbon and lighter vaporous stream, withdrawing from said separation zone a 3-methyl-1-butene product stream, passing a $C_5$ hydrocarbon stream containing isoprene and said unconverted said one component from said separation zone to a hydrogenation zone in which isoprene is contacted with a selective hydrogenation catalyst which is adapted to initiate the reaction of selective hydrogenation of isoprene to one of 2-methyl-1-butene and 2-methyl-2-butene, passing hydrogen to said hydrogenation zone, contacting the hydrocarbon feed stream in said hydrogenation zone with a hydrogenation catalyst, withdrawing an effluent stream containing 2-methyl-1-butene and 2-methyl-2-butene from said hydrogenation zone, separating hydrogen from said effluent stream, passing a hydrogen-free hydrogenation zone effluent containing 2-methyl-1-butene, 2-methyl-2-butene, normal pentenes and normal pentanes unavoidably formed in the system to a first fractionation zone in which 2-methyl-1-butene, normal pentenes and normal pentanes are separated from 2-methyl-2-butene, passing an overhead product stream containing 2-methyl-1-butene, normal pentenes and normal pentanes from said first fractionation zone as recycle to said solvent extraction zone, passing a bottom product stream containing 2-methyl-2-butene from said first fractionation zone as recycle to said isomerization zone, passing said hydrocarbon stream containing unavoidably some 2-methyl-1-butene, 2-methyl-2-butene as well as normal pentane, normal pentenes and isopentane, withdrawn from said solvent extraction zone, to a second fractionation zone in which 2-methyl-2-butene is separated from normal pentenes, normal pentanes, isopentane and 2-methyl-1-butene, withdrawing an overhead product stream containing said 2-methyl-1-butene, and isopentanes, normal pentenes and normal pentanes from said second fractionation zone to thereby remove the impurities from the system, and passing a product stream containing 2-methyl-2-butene from said second fractionation zone as feed to said isomerization zone.

References Cited by the Examiner

UNITED STATES PATENTS

| | | | |
|---|---|---|---|
| 2,434,634 | 1/1948 | Bates | 260—683.2 |
| 2,454,171 | 11/1948 | Hepp | 260—683.2 |
| 2,900,429 | 8/1959 | Heinemann et al. | 260—683.2 |
| 2,921,103 | 1/1960 | Pitzer | 260—683.2 |
| 2,934,574 | 4/1960 | Viland | 260—683.2 |

PAUL M. COUGHLAN, JR., *Primary Examiner.*

ALPHONSO D. SULLIVAN, *Examiner.*